United States Patent [19]
Gao et al.

[11] Patent Number: 6,073,096
[45] Date of Patent: Jun. 6, 2000

[54] SPEAKER ADAPTATION SYSTEM AND METHOD BASED ON CLASS-SPECIFIC PRE-CLUSTERING TRAINING SPEAKERS

[75] Inventors: Yuqing Gao, Mount Kisco; Mukund Padmanabhan, Ossining; Michael Alan Picheny, White Plains, all of N.Y.

[73] Assignee: International Business Machines Corporation, Armonk, N.Y.

[21] Appl. No.: 09/018,350

[22] Filed: Feb. 4, 1998

[51] Int. Cl.[7] .................................................. G10L 15/06
[52] U.S. Cl. .......................................... 704/245; 704/255
[58] Field of Search .................................. 704/231, 238, 704/245, 250, 255, 256

[56] References Cited

U.S. PATENT DOCUMENTS

| | | | |
|---|---|---|---|
| 5,598,507 | 1/1997 | Kimber et al. | 704/246 |
| 5,659,662 | 8/1997 | Wilcox et al. | 704/245 |
| 5,787,394 | 7/1998 | Bahl et al. | 704/238 |
| 5,793,891 | 8/1998 | Takahashi et al. | 382/228 |
| 5,812,975 | 4/1999 | Komori et al. | 704/246 |
| 5,835,890 | 10/1998 | Matsui et al. | 704/255 |
| 5,864,810 | 1/1999 | Digalakis et al. | 704/255 |
| 5,895,447 | 4/1999 | Ittycheriah et al. | 704/231 |
| 5,983,178 | 11/1999 | Naito et al. | 704/245 |

OTHER PUBLICATIONS

X.D. Huang, "A Study on Speaker–Adaptive Speech Recognition", School of Computer Science, Carnegie Mellon University, Pittsburg, PA, pp. 278–283.

Richard Schwartz et al., "Comparative Experiments on Large Vocabulary Speech Recognition", BBN Systems & Technologies, Cambridge, MA, pp. 75–80.

F. Alleva et al., "Applying Sphinx–II to the DARPA Wall Street Journal CSR Task", School of Computer Science, Carnegie Mellon University, Pittsburgh, PA, pp. 393–398.

Jean–Luc Gauvain et al., "Maximum a Posteriori Estimation for Multivariate Gaussian Mixture Observations of Markov Chains", IEEE Transactions on Speech and Audio Processing, vol. 2, No. 2, Apr. 1994, pp. 291–298.

C. J. Leggetter et al., "Maximum Likelihood Linear Regression for Speaker Adaptation of Continuous Density Hidden Markov Models", Computer Speech and Language, 1995, 9, pp. 171–185.

Tetsuo Kosaka et al., "Speaker–independent Speech Recognition Based on Tree–structured Speaker Clustering", Computer Speech and Language, 1996, 10, pp. 55–74.

M. Padmanabhan et al., "Speaker Clustering and Transformation for Speaker Adaptation in Large–Vocabulary Speech Recognition Systems", Apr. 1996, ©1995 IEEE.

M. Yamada et al., "Fast Algorithm for Speech Recognition Using Speaker Cluster HMM", ESCA, Eurospeech97, Rhodes Greece, ISSN 1018–4074, pp. 2043–2046.

Timothy J. Hazen et al., "A Comparison of Novel Techniques for Instantaneous Speaker Adaptation[1]", ESCA, Eurospeech97, Greece, ISSN 1018–4074, pp. 2047–2050.

*Primary Examiner*—David R. Hudspeth
*Assistant Examiner*—Martin Lerner
*Attorney, Agent, or Firm*—F. Chau & Associates, LLP

[57] ABSTRACT

A method of speech recognition, in accordance with the present invention includes the steps of grouping acoustics to form classes based on acoustic features, clustering training speakers by the classes to provide class-specific cluster systems, selecting from the cluster systems, a subset of cluster systems closest to adaptation data from a test speaker, transforming the subset of cluster systems to bring the subset of cluster systems closer to the test speaker based on the adaptation data to form adapted cluster systems and combining the adapted cluster systems to create a speaker adapted system for decoding speech from the test speaker. System and methods for building speech recognition systems as well as adapting speaker systems for class-specific speaker clusters are included.

42 Claims, 3 Drawing Sheets

SPEAKER ADAPTATION SYSTEM AND METHOD BASED ON CLASS-SPECIFIC PRE-CLUSTERING TRAINING SPEAKERS

BACKGROUND OF THE INVENTION

1. Field of the Invention

The present invention relates to speech recognition and, more particularly, to a system and method of speech recognition based on pre-clustering of training models for continuous speech recognition.

2. Description of the Related Art

In an effort to provide a more usable, convenient and rapid interface for speech recognition, numerous approaches to voice and sound recognition have been attempted. However, variations in acoustic signals, even from a single speaker present substantial signal processing difficulties and present the possibility of errors or ambiguity of command understanding by the system which may only be partially avoided by substantial increase of processing complexity and increase in response time.

One proposed technique, described in an article by M. Padmanabhan, et al, "Speaker Clustering Transformation for Speaker Adaptation in Large-Vocabulary Speech Recognition Systems", ICASSP '96, addressing the above-mentioned issues includes a speaker adaptation scheme based on a speech training corpus containing a number of training speakers, some of whom are closer, acoustically, to a test speaker, than others. Given a test speaker, if the acoustic models are re-estimated from a subset of the training speakers who are acoustically close to the test speaker, the proposed technique should find a better match to the test data of the speaker. A further improvement could be obtained if the acoustic space of each of these selected speakers is transformed to come closer to the test speaker.

Given a test speaker, the adaptation procedure used in the proposed technique is: (1) find a subset of speakers from the training corpus, who are acoustically close to the test speaker; (2) transform the data of each of these speakers to bring it closer to the test speaker, and (3) use only the (transformed) data from these selected speakers, rather than the complete training corpus, to re-estimate the model (Gaussian) parameters. This scheme was shown to produce better speaker adaptation performance that other algorithms, for example maximum likelihood linear regression (MLLR), or maximum a posteriori (MAP) adaptation, when only a small amount of adaptation data was available.

The implementation of the proposed technique uses the transformed training data of each selected training speaker to re-estimate the system parameters. This requires the entire training corpus to be available on-line for the adaptation process, and is not practical in many situations. This problem can be circumvented if a model is stored for each of the training speakers, and the transformation (to bring the training speaker closer to the test speaker) is applied to the model. The transformed models are then combined to produce the speaker-adapted model. However, due to the large number of training speakers, storing the models of each training speaker would require a prohibitively large amount of storage. Also, sufficient data from each training speaker to robustly estimate the parameters of the speaker-dependent model for the training speaker may not be available.

Therefore, a need exists for an improved system and method of speech recognition which adapts to different speakers. A further need exists for reducing storage space needed to store training speaker models.

SUMMARY OF THE INVENTION

A method of speech recognition includes the steps of selecting from a group of systems, a subset of systems closest to adaptation data from a speaker, transforming the subset of systems to bring the subset of systems closer to the speaker based on the adaptation data to form adapted cluster systems and combining the adapted cluster systems to create a speaker adapted system for decoding speech from the speaker.

In alternate methods the step of transforming may further include employing a maximum a posteriori adaptation or MLLR (maximum likelihood linear regression). The step of selecting may further include calculating a likelihood for each system, ranking each system according to likelihood and selecting a predetermined number of systems closest to the speaker adaptation data to form the subset of systems. The group of systems may include class-specific clusters and further comprises the step of building class-specific cluster systems based on speaker dependent systems and partitions of acoustic space, each partition of acoustic space being characterized by a different set of acoustic features. The step of transforming may include transforming the subset of systems to adapt the subset of systems to a speaker independent system. Each system of the group of systems may include a full-sized Hidden Markov Model. The step of transforming may be performed by employing a Bayesian adaptation.

A method of building class-specific cluster systems includes the steps of providing a speaker dependent system for each of a plurality of training speakers, providing an acoustic space for each of the training speakers, each acoustic space being characterized by a set of acoustic features, grouping the speaker dependent systems with the acoustic spaces to build acoustic spaces with common features from all the speaker dependent systems and clustering the grouped acoustic spaces to form cluster systems based on a common acoustic characteristic.

In alternate methods of building class-specific cluster systems, the step of combining the cluster systems to form a speaker cluster system of all the acoustic spaces may be included. The step of clustering may include the step of clustering by a bottom-up method and include, for example, a Gaussian likelihood. The step of clustering may include the step of clustering by a top-down method and include, for example, measuring a distance between acoustic features between speakers by a Euclidean distance. The step of clustering the grouped acoustic spaces to form cluster systems based on a common acoustic characteristic may include the step of clustering the grouped acoustic spaces to form cluster systems based on a common accent or a common gender. The step of providing a speaker dependent system for each of a plurality of training speakers may further include the steps of decoding training data of a speaker based on a speaker-independent system and building the speaker dependent system by storing a set of labeled acoustic vectors for the speaker. The step of providing an acoustic space for each of the training speakers may further include the steps of gathering E-M (expectation maximization) counts of a same context from a speaker independent system, generating a speaker independent context-independent system from the counts and clustering the context-independent system to generate partition of a whole acoustic space into the acoustic spaces.

Another method of speech recognition includes the steps of providing a speaker dependent system for each of a plurality of training speakers, providing an acoustic space for each of the training speakers, each acoustic space being characterized by a set of acoustic features, grouping the speaker dependent systems with the acoustic spaces to build acoustic spaces with common features from all the speaker dependent systems, clustering the grouped acoustic spaces to form cluster systems based on a common acoustic characteristic, selecting from a group of cluster systems, a subset of cluster systems closest to adaptation data from a speaker, transforming the subset of cluster systems to bring the subset of cluster systems closer to the speaker based on the adaptation data to form adapted cluster systems and combining the adapted cluster systems to create a speaker adapted system for decoding speech from the speaker.

In alternate methods of speech recognition, the step of selecting may further include calculating a likelihood for each cluster system, ranking each cluster system according to likelihood and selecting a predetermined number of cluster systems closest to the speaker adaptation data to form the subset of cluster systems. The group of systems may include class-specific clusters and further include the step of building class-specific cluster systems based on speaker dependent systems and partitions of acoustic space, each partition of acoustic space being characterized by a different set of acoustic features. Each cluster system of the group of cluster systems may include a full-sized Hidden Markov Model. The step of combining the cluster systems to form a speaker cluster system of all the acoustic spaces may be included. The step of clustering may include the step of clustering by a bottom-up method and include for example, a Gaussian likelihood. The step of clustering may include the step of clustering by a top-down method, and include, for example, measuring a distance between acoustic features between speakers by a Euclidean distance. The step of providing a speaker dependent system for each of a plurality of training speakers may further include the steps of decoding training data of a speaker based on a speaker-independent system and building the speaker dependent system by storing a set of labeled acoustic vectors for the speaker. The step of providing an acoustic space for each of the training speakers may further include the steps of gathering E-M counts of a same context from a speaker independent system, generating a speaker independent context-independent system from the counts and clustering the context-independent system to generate partition of a whole acoustic space into the acoustic spaces.

A system for speech recognition includes means for selecting from a group of systems, a subset of systems closest to adaptation data from a speaker, means for transforming the subset of systems to bring the subset of systems closer to the speaker based on the adaptation data to form adapted cluster systems and means for combining the adapted cluster systems to create a speaker adapted system for decoding speech from the speaker.

In alternate embodiments of systems for speech recognition, the means for transforming may include means for employing a maximum a posteriori adaptation or MLLR. The means for selecting may include means for calculating a likelihood for each system, means for ranking each system according to likelihood and means for selecting a predetermined number of systems closest to the speaker adaptation data to form the subset of systems. The group of systems may include class-specific clusters and further comprises means for building class-specific cluster systems based on speaker dependent systems and partitions of acoustic space, each partition of acoustic space being characterized by a different set of acoustic features. Each system of the group of systems may include a full-sized Hidden Markov Model.

Another system for speech recognition includes a speaker dependent system for each of a plurality of training speakers, an acoustic space for each of the training speakers, each acoustic space being characterized by a set of acoustic features, means for grouping the speaker dependent systems with the acoustic spaces to build acoustic spaces with common features from all the speaker dependent systems, means for clustering the grouped acoustic spaces to form cluster systems based on a common acoustic characteristic, means for selecting from a group of cluster systems, a subset of cluster systems closest to adaptation data from a speaker, means for transforming the subset of cluster systems to bring the subset of cluster systems closer to the speaker based on the adaptation data to form adapted cluster systems and means for combining the adapted cluster systems to create a speaker adapted system for decoding speech from the speaker.

In alternate embodiments of the system for speech recognition, the means for selecting may further include means for calculating a likelihood for each cluster system, means for ranking each cluster system according to likelihood and means for selecting a predetermined number of cluster systems closest to the speaker adaptation data to form the subset of cluster systems.

The group of cluster systems includes class-specific clusters based on speaker dependent systems and partitions of acoustic space, each partition of acoustic space being characterized by a different set of acoustic features. Each cluster system of the group of cluster systems may include a full-sized Hidden Markov Model. A speaker cluster system may be formed by combining all of the acoustic spaces.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
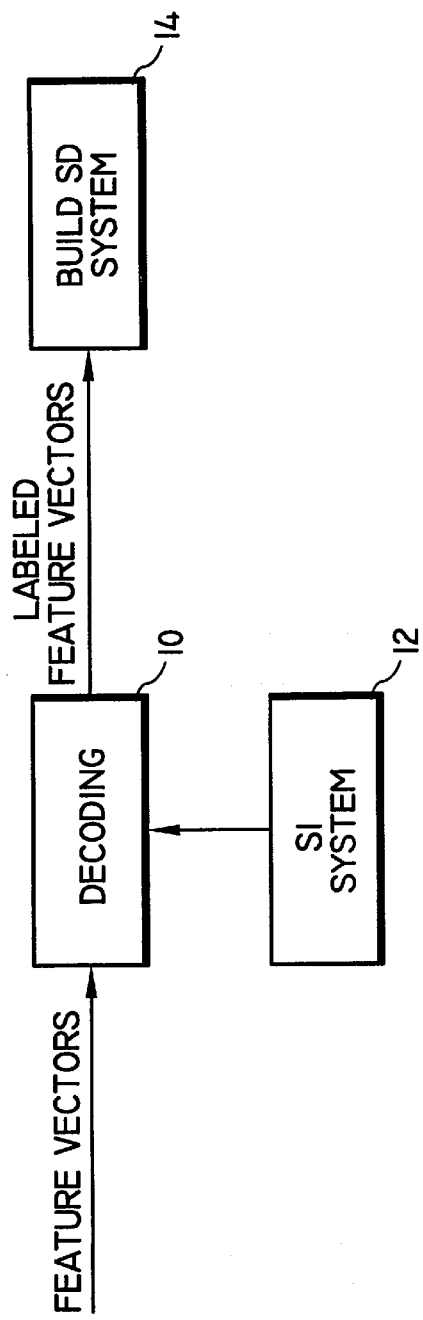
FIG. 1 is a flow/block diagram showing a method and system for building a speaker dependent model for speech recognition in accordance with the present invention.

The present invention relates to speech recognition and, more particularly, to a system and method of speech recognition based on pre-clustering of training models for continuous speech recognition. The invention is based on pre-clustering training speakers acoustically into clusters. Each training speaker is represented by an acoustic space which is characterized by a set of features. Each speaker's acoustic space is divided into subspaces. Each subspace represents a class which may include a set of phones, allophones, context-dependent phones, or context-dependent allophones. The speaker pre-clustering is done for each subspace, and can also be viewed as a class-specific partitioning of the acoustic space in terms of speakers. For each speaker cluster, an acoustic system (called a "cluster-dependent system") is trained using speech data from the speakers who belong to the cluster. When a test speaker's data is available, the cluster-dependent systems are ranked for each subspace according to the distances between the test speaker and each cluster, and a subset of these clusters, acoustically closest to the test speaker, is chosen. Then the model for each of the selected clusters is transformed to bring the model closer to the test speaker's acoustic space. Finally these adapted cluster models are combined to form a speaker adapted system. Hence, for each acoustic subspace, speaker clusters are chosen that are acoustically close to the test speaker, rather than individual training speakers.

This method addresses the problem of excessive storage for the training speaker models, because the number of clusters is far fewer than the number of training speakers, and it is relatively inexpensive to store a model for each cluster. Also as each cluster contains a number of speakers, sufficient data is available to robustly estimate the parameters of the model for the cluster.

Class-Specific Pre-Clustering Training Speakers

Pre-clustering training speakers finds similarities across different speakers. It is advantageous to define a set of acoustic characteristics to represent each speaker. In prior art speaker identification/verification frameworks, phonetic information is often ignored in representing a speaker. For example, a codebook, where the mixture components are not associated with phones or phone related units, may be used to represent a speaker.

However, in the present invention, the phonetic information is used in the speaker models. A phone-based or more sophisticated Hidden Markov Model (HMM) system, such as context-dependent phone HMM system, can be used to represent a speaker for the speaker pre-clustering purpose. In one experiment, described in more detail below, 52 phones are used, consequently, 52, 3-state HMMs, i.e., 156 context-independent states, are used to represent each speaker. The advantage of using phonetic related units to represent a speaker is that the speaker clustering is more flexible. A class specific based speaker clustering or a group of selected phones may be used to perform the clustering, while ignoring noise-like phones in the clustering procedure.

In class-specific based speaker clustering, each speaker's acoustic space is divided into subspaces. A bottom-up clustering scheme is used to cluster a speaker's arc space into subspaces. If a speaker's acoustic space is represented by features other than arcs, for example, phones or leaves, the generation of subspaces will be different accordingly. Speaker clustering is performed for each subspace to create a class-specific based speaker clustering.

Speaker clustering may be performed by different methods. One method is bottom-up, and another is top-down. When the bottom-up scheme is used, a Gaussian log likelihood is preferably used as a distance measure during the procedure. When the top-down is used, Euclidean distance is preferably used. Other distance measures may be used in both clustering procedures, however. The Gaussian likelihood and the Euclidean distance may be obtained by the following by computing the following expressions.

$$\log P_i = -c_i \left[ \frac{n}{2} \log(2\pi) + \frac{1}{2} |\underline{\Lambda}_i| \right] \quad (1)$$

where, $c_i$ is an E-M count, $\underline{\Lambda}$ is the variance of the Gaussian and n is the dimension.

In measuring the similarity between speakers, Gaussian log likelihoods are computed between the same arcs of phone models of the speakers. The overall likelihood between two speakers, for example, is a summation over all arcs in the subspace.

If speaker i and j are parameterized by: $c_i^k, \underline{\mu}_i^k, \underline{\Lambda}_i^k$ and $c_j^k$, $\underline{\mu}_j^k, \underline{\Lambda}_j^k$, k=1, ..., K, K is the number of arcs, a merged Gaussian may be computed as:

$$\hat{c}^k = c_i^k + c_j^k \quad (2)$$

$$\hat{\underline{\mu}}^k = \frac{c_i^k \underline{\mu}_i^k + c_j^k \underline{\mu}_j^k}{\hat{c}^k} \quad (3)$$

$$\hat{\underline{\Lambda}}^k = \frac{c_i^k \underline{\Lambda}_i^k + c_i^k (\underline{\mu}_i^k - \hat{\underline{\mu}}^k)^2 + c_j^k \underline{\Lambda}_j^k + c_j^k (\underline{\mu}_j^k - \hat{\underline{\mu}}^k)^2}{\hat{c}^k} \quad (4)$$

Then, using formula (1) (the likelihood is computed).

The bottom-up clustering starts with each node representing a speaker. At every step, two nodes are merged into one node such that the merged node has a larger likelihood than all other possible merges. The merging continues until the bottom-up tree has the desired number of nodes on the top level.

The distance measure used in the bottom-up clustering procedure is preferably the Gaussian log likelihood, although other distance measures such as Kullback-Leibler, Euclidean, etc. may be employed.

Models for the Clusters

After pre-clustering the speakers from each acoustic subspace, an acoustic characterization for each speaker cluster is built to determine which clusters are close to the test speaker. An acoustic system is trained using speech data from the speakers who belong to the cluster. The cluster-dependent system is chosen to have the same complexity as a speaker-independent system.

To make the cluster system robust even if the underlining cluster does not have sufficient training speech, a Bayesian adaption technique, known to those skilled in the art, may be used to smooth each cluster-independent system. In this way, cluster systems are more reliable.

The acoustic characterizations or models may be better understood by the following explanation. Let L denote the total number of Gaussians, d denote the dimension of the acoustic features, and $\underline{\mu}_i^{ind}, \underline{\Lambda}_i^{ind}, p_i^{ind}$, i=1, ..., L denote the means, variances and priors of a speaker-independent acoustic model, and let the $k_{th}$ cluster be parameterized by $\underline{\mu}_i^k, \underline{\Lambda}_i^k, p_i^k$ i=1, ..., L. Using the re-estimation formulae $$p_i^k = \frac{c_i + \tau_i}{\sum_{j \in J} (c_j + \tau_j)} \quad \tau_i = p_i^{ind} T \quad (5)$$

where J is the collection of Gaussians which belong to, for example, the same leaf as the i-th Gaussian does, and τ is a constant.

$$\underline{\mu}_i^k = \frac{\eta_i + \tau_i \underline{\mu}_i^{ind}}{c_i + \tau_i} \quad (6)$$

$$\underline{\underline{\Delta}}_i^k = \frac{\underline{\gamma}_i + \tau_i[\underline{\underline{\Delta}}_i^{ind} + \underline{\mu}_i^{ind}\underline{\mu}_i^{ind,T}]}{c_i + \tau_i} - \underline{\mu}_i^k \underline{\mu}_i^{k,T} \quad (7)$$

where $c_i = \sum_t c_i(t)$, $\eta_i = \sum_t c_i(t)\underline{y}_t$, $$\underline{\gamma}_i = \sum_t c_i(t)\underline{y}_t \underline{y}_t^T.$$

Here $c_i(t)$ is the posteriori probability of the Gaussian i at time t, conditioned on all acoustic observations $\underline{y}_1^T$, and the terms $c_i(t)$, $\eta_i$, $\underline{\gamma}_i$ are usually referred to as the expectation maximization (E-M) counts or counts.

Selecting a Subset of Clusters

A subset of the clusters which are acoustically closest to the test speaker are located. A distance measure to be used in the cluster selection is selected according to a selection procedure.

A subset of the training speakers is selected and a phone-based speaker model is evaluated that is closest to each training speaker based on various distance measures. Ideally of course, the closest model should be the model of the selected training speaker. The results indicated that a Euclidean distance measure is preferable, however other measures are contemplated. For example, when the Mahalanobis distance was used for speaker recognition, the correct model was selected only 62.3% of the time. While when Euclidean distance was used, the correct model was selected 100% of the time.

Speech data from a test speaker is first decoded using a speaker-independent system to generate a transcription. Subsequently, the data is Viterbi-aligned against the transcription and each acoustic observation is tagged with, for example an allophone identification. The distance of the adaptation data, conditioned on the Viterbi alignment, to each cluster-dependent model is then calculated using each cluster model, and the clusters are ranked in the order of this distance. The top N clusters are then selected as being acoustically close to the test speaker. In computing this distance, we have the option of using the Euclidean distance or the Mahalanobis distance depending on the final recognition accuracy.

In class-specific speaker clustering, a set of clusters for each phone class (for each acoustic surface) is selected. These sub models are combined to cover the whole acoustic space.

Transformation and re-estimation of Gaussians

A transformation technique, preferable MLLR, is used to transform a cluster-dependent model and bring it closer to the test speaker. Given some observations from a test speaker, a subset of clusters can be selected using the above procedure. Given a selected cluster model, mean $\underline{\mu}_i^k$ and variance $\underline{\underline{\Delta}}_i^k$, one can compute a posterior probability, $c_i^k(t)$ of the i-$th$ Gaussian at time t, conditioned on all the acoustic observations in the adaptation data, and compute the transformations so as to maximize the likelihood of the adaptation data, given the selected cluster model. This is equivalent to minimizing the following objective function:

$$\sum_{i,t} c_i^k(t)[(\underline{x}_t - \underline{\underline{A}}^k \hat{\underline{\mu}}_i^k)^T \underline{\underline{\Delta}}_i^{k-1} (\underline{x}_t - \underline{\underline{A}}^k \hat{\underline{\mu}}_i^k) + \log(|\underline{\underline{\Delta}}_i^k|)] \quad (8)$$

with respect to $A^k$. Here, $A^k$ is a (d)×(d+1) matrix, and $\hat{\underline{\mu}}_i^k$ is a (d+1)×1 vector obtained from $(\underline{\mu}_i^k)$ as $(\hat{\underline{\mu}}_i^k) = [(\underline{\mu}_i^k)^T + 1]^T$.

Once the transformations have been computed, the transformed means of the cluster model; become $A^k\underline{\mu}_i^k$. The Gaussian means of the adapted model can be formed by accumulating the transformed model means of all selected clusters using the re-estimation formulae given below, while the variances of the model are left unchanged at the speaker-independent values.

$$\underline{\mu}_i^{adapted} = \frac{\left[\sum_k c_i^k \underline{\underline{A}}^k \underline{\mu}_i^k\right]}{\sum_k c_i^k} \quad (9)$$

where $c_i^k = \Sigma_t c_i^k(t)$.

An alternate method of pre-clustering training speakers is described for cases where the population of training speakers is very large and a large amount of training speech data is available. In those cases, if a selection of the number of clusters is performed according to the accent regions and genders, clusters corresponding to the accent regions and genders may be built. For example, each cluster may represent roughly one region and gender. One important aspect is that speaker clustering is based on a selected group of phones while ignoring those unvoiced or noise-like phones. For each cluster, a sufficient amount of data is preferable for training a good system. Given a new testing speaker, the same procedure described above is used to rank all clusters, however, only one cluster is selected for use with the new speaker. In a preferred embodiment, only one sentence is needed to decide which cluster is proper for the new speaker.

This alternate method may be considered a very quick enrollment or adaptation for a speaker-independent recognition system, because the selected cluster is used for recognition, and the recognition error rate reduces to about 15% to 20%, compared to a speaker independent system, before any large amount adaptation data and transformation based or MAP based adaptation is applied. Not only is the error rate reduced by for example greater than 15%, but the speed of the recognition system has been increased significantly, by for example at least 13%. The method has been evaluated by US English and UK English continuous dictation systems.

Referring now in specific detail to the drawings, it should be understood that the elements shown in FIGS. 1–5 may be implemented in various forms of hardware, software or combinations thereof. Preferably, these elements are implemented in software on one or more appropriately programmed general purpose digital computers having a processor and memory and input/output interfaces. Referring to FIG. 1, a block/flow diagram is shown for speaker clustering using a speaker independent system to build a speaker dependent system for each speaker. For each speaker used in development of cluster systems in accordance with the present invention, preprocessing is performed to convert speech into feature vectors or training data. The feature vectors are the input into a decoder 10 and decoded according to a speaker-independent (SI) system or model 12. Decoder 10 outputs labeled feature vectors which are used to build a speaker dependent (SD) model or system 14.

Figure 2:
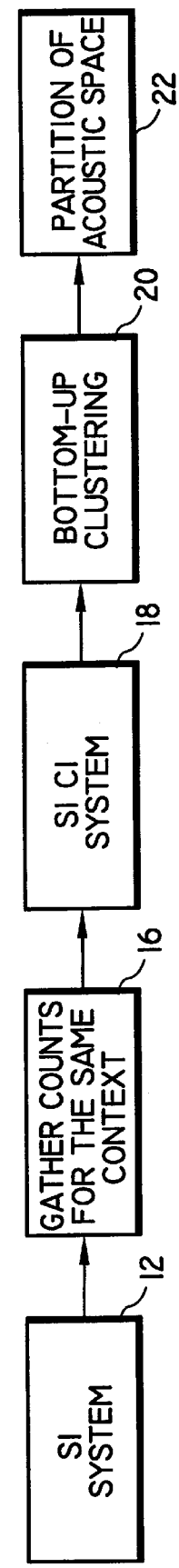
FIG. 2 is a flow/block diagram showing a method and system for partitioning acoustic space for speech recognition in accordance with the present invention.

Referring to FIG. 2, a block/flow diagram is shown for training cluster systems for partitioning acoustic space in accordance with the present invention. Speaker-independent model 12 is used as an input to a counter 16. Counter 16 gathers counts of the same context in the speaker-independent model and stores the counts to create context independent models, for example based on phones or leaves. These counts are compiled to create a speaker-independent, context-independent system or model 18. Bottom-up or top-down clustering is used to group or cluster these speaker-independent, context-independent acoustics into classes having similar features, for example arcs (states), leaves or tri-phones, in block 20. When clustering is complete an acoustic space is partitioned into acoustic subspaces 22. Each subspace 22 represents a class which can be a set of phones, allophones or context-dependent phones or allophones.

Figure 3:
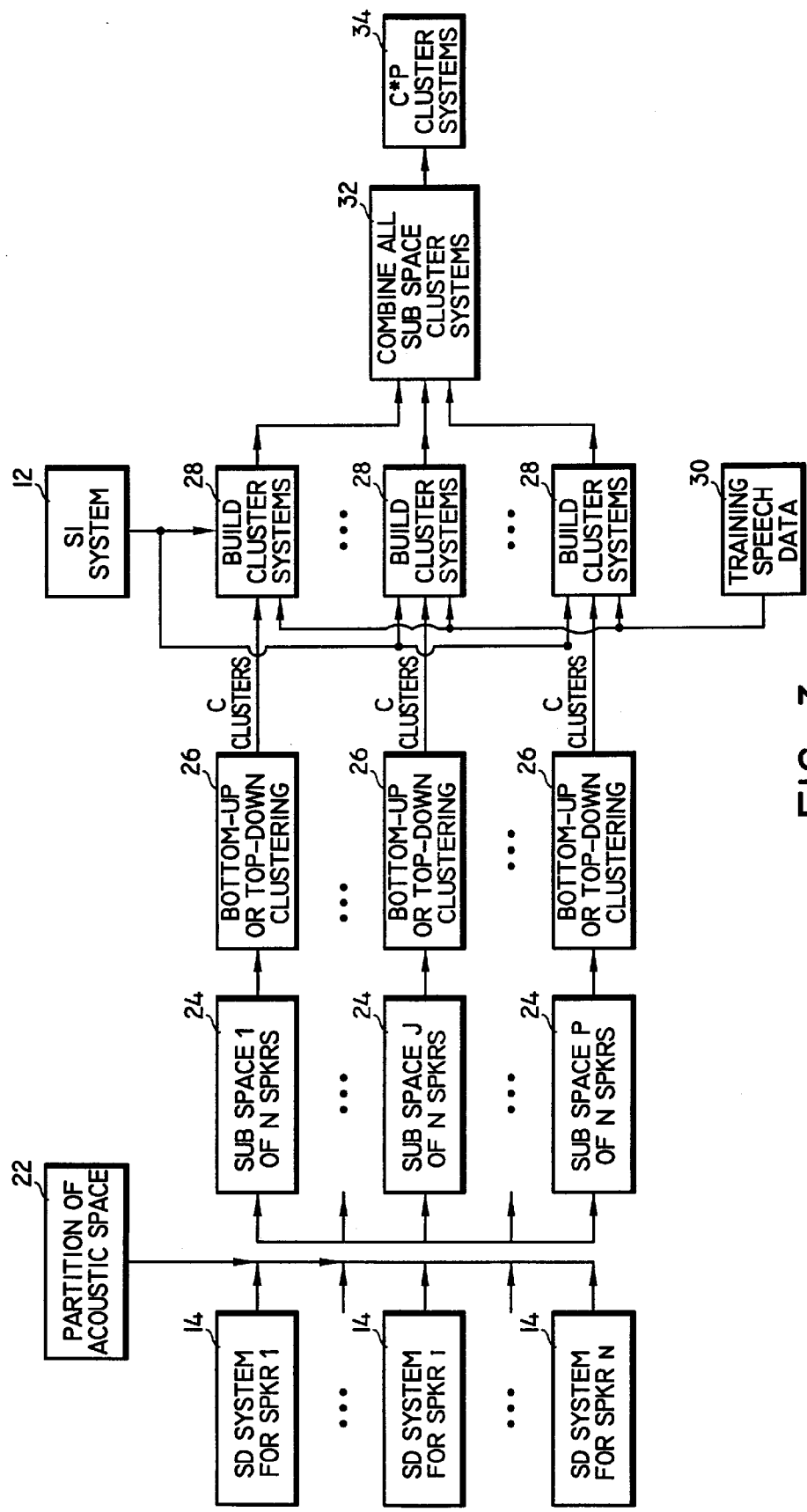
FIG. 3 is a flow/block diagram showing a method and system for building a cluster system for speech recognition in accordance with the present invention.

Referring to FIG. 3, a block/flow diagram is shown for completing speaker clustering for each acoustic subspace created in FIG. 2. A plurality of speaker dependent systems 14 are combined with the acoustic subspaces created in acoustic space 22 to form a plurality of subspaces 24 having speaker data closest to each speaker from all of the N speakers. The total number of subspaces 24 is represented by P. According to the partition of the entire acoustic space into subspaces 22, acoustic features of a subspace 1 of all N speakers are placed together in block 24 subspace 1. Similarly, features of subspace j of all N speakers are placed together in 24 subspace j, and so on. In block 26, N speakers for each subspace are clustered into C groups. Each subspace generates different speaker clusters. Bottom-up or top-down clustering is performed for each subspace 24 of N speakers in block 26. A plurality of cluster systems 28 are built by receiving and storing cluster data C from the clustering process in blocks 26. Each cluster system is represented by a full-sized HMM system and are therefor phone-associated systems. Using training data from block 30, the speaker cluster systems 28 are built for each subspace. Cluster systems 28 are also smoothed with speaker independent system 12. Cluster systems 28 may also receive and store input from speaker independent system 12 and/or from a training speech database 30. Training data stored in database 30 can be tailored to the application as appropriate. For example, training data for a particular accent may be input to improve the model. In block 32, all cluster systems 28 are combined into one acoustic space to form C*P cluster systems or a full space speaker cluster system 34.

Figure 4:
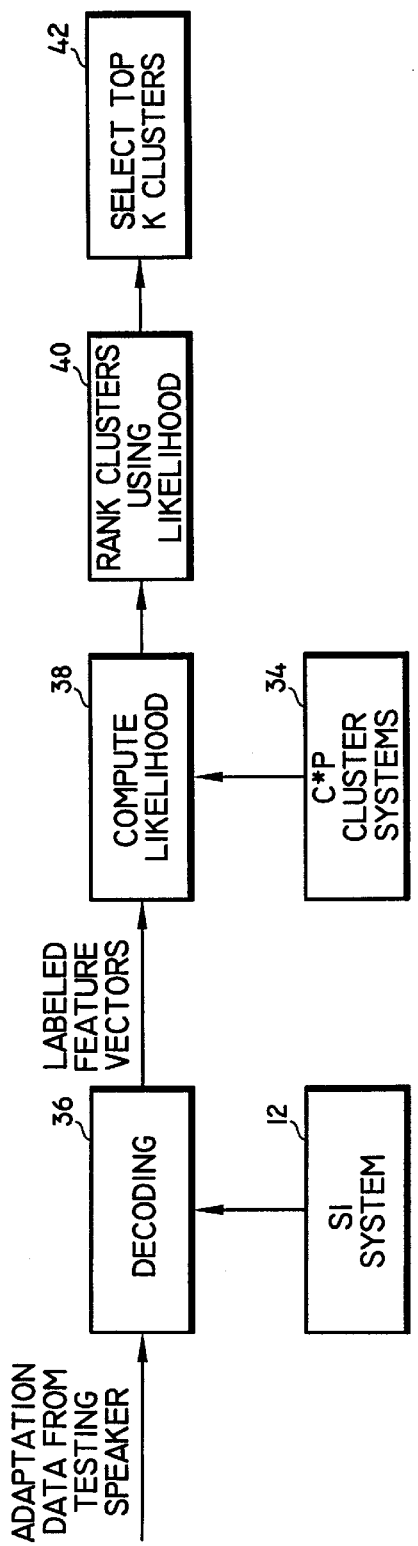
FIG. 4 is a flow/block diagram showing a method and system for selecting closest clusters to a speaker for speech recognition in accordance with the present invention.

Referring to FIG. 4, a block/flow diagram is shown for speaker adaptation. Adaptation data (data to be decoded) from a testing speaker is received in a decoder 36 and aligned according to speaker-independent system 12. The adaptation data may be as small as a single sentence spoken by the speaker. Decoder 36 outputs labeled feature vector to a processor 38. Processor 38 computes the likelihood of the feature vectors against the C*P cluster systems 34. The likelihoods for all the feature vectors are ranked in block 40 and the K closest clusters from among all the C*P clusters 34 are selected in block 42. The value of K can be set as desired by an operator.

Figure 5:
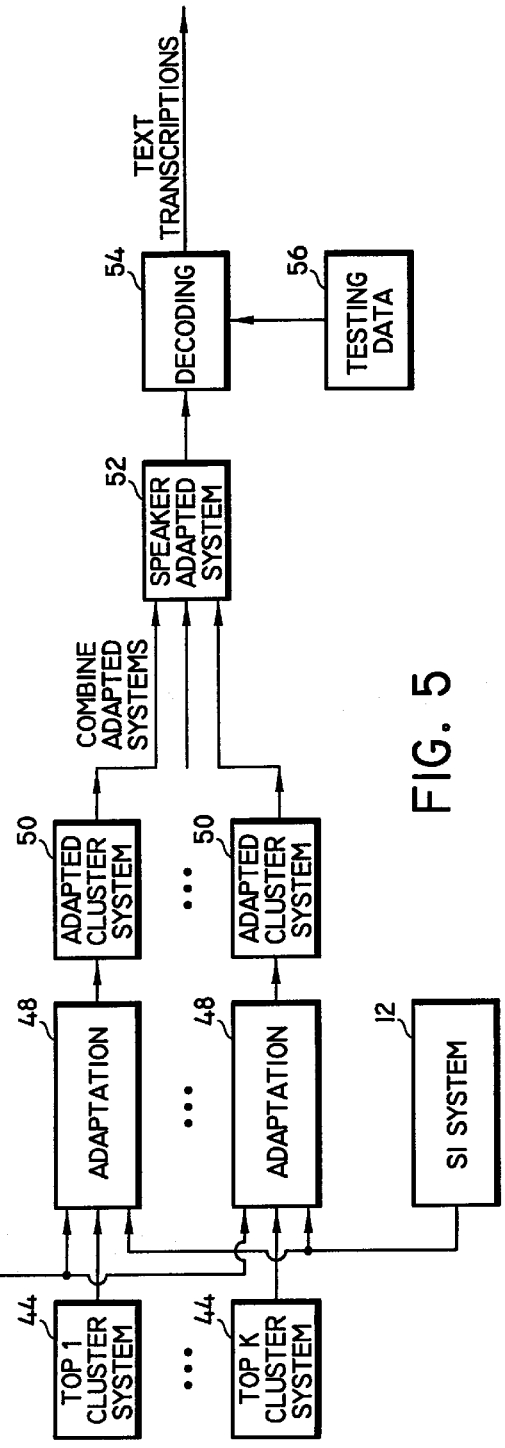
FIG. 5 is a block/flow diagram showing a speech recognition system using class-specific clusters for speech recognition in accordance with the present invention.

Referring to FIG. 5, a block/flow diagram is shown for decoding speech based on class-specific pre-clustering training speakers. Top K clusters 44 and adaptation data of the testing speaker from block 46 are transformed in block 48 to bring each cluster system closer to the testing speaker. In block 48, the transformation is performed based on adaptation algorithms, for example MLLR, MAP adaptation, etc. The transformation is performed on each of the K cluster systems 44 and results in adapted cluster systems 50 for the testing speaker. Included also as an input to the transformation is speaker independent system 12. Adapted cluster systems 50 are combined to create a speaker adapted system 52 for the individual testing speaker. Now, testing data or data to be recognized by the speech recognition system is supplied to a decoder 54 from block 56, testing data. Decoder 54 decodes the testing data based on speaker adapted system 52 to provide an improved text transcription or decoded speech of the testing data.

Experiments

Experiments were performed to demonstrate the system and method of the present invention. In the experiments, the size of a model was 36,000 Gaussians. The training corpus (from a Wall Street Journal database) has 284 speakers, half male and half female. Each speaker has about 100 sentences of speech data in the training corpus.

The present invention was evaluated using 10 test speakers and also was compared with a standard MLLR adaptation as well. Each of the 10 test speakers had 50 sentences of adaptation data and 61 sentences of testing data.

A baseline speaker-independent system had an average word error rate of 16.35% over the 10 test speakers. MLLR adaptation reduces the error rate to 12.67% using 50 adaptation utterances with an average of 25 transformations for each speaker.

For the speaker-pre-clustering, each training speaker is modeled by 156 Gaussians (one Gaussian per state, with 3 states for each of 52 phones). Two types of experiments were performed. One was to divide arc space into 8 subspaces, i.e., 8 classes, and the other experiment used only one space. When these training speaker models are bottom-up clustered, the scheme generates 15 clusters, each containing anywhere from 9 to 31 speakers. Each cluster had about 1000–5000 utterances and a 36,000-Gaussian system was built for each cluster by using the data from the speakers belonging to the cluster.

In the Tables 1 and 2 below, the performance with the use of the Mahalanobis distance and Euclidean distance in selecting close clusters for each test speaker are compared. In Tables 1 and 2, two different ways of selecting the number of clusters are compared. In the first way (Table 1), the number of selected clusters was fixed. In the second way (Table 2), a subset of clusters was selected subject to a maximum number of speakers in the selected clusters. For a given threshold of maximum number of selected speakers, the selected number of clusters for test speakers may be different from one test speaker to another depending on how many speakers each cluster contains.

TABLE 1

| # of clusters | Mahalanobis | Euclidean |
| --- | --- | --- |
| 3 | 12.56% | 12.11% |
| 5 |  | 12.07% |
| 6 | 12.44% |  |
| 8 | 12.29% |  |
| 10 | 12.18% |  |
| 12 | 12.20% |  |
| 15 | 12.25% |  |

TABLE 2

| # of spkrs: | | | |
| --- | --- | --- | --- |
| Max | Ave | Mahalanobis | Euclidean |
| 80 | 69 | 12.51% | 12.18% |
| 90 | 76 |  | 12.05% |
| 100 | 89 | 12.40% | 12.01% |
| 110 | 100 |  | 12.03% |
| 120 | 110 |  | 12.18% |
| 150 | 141 | 12.26% |  |
| 200 | 184 | 12.12% |  |

From the viewpoint of recognition error rate of the final speaker adapted system, the Euclidean distance measurement is superior to the Mahalanobis distance. Different distance measures can be compared in terms of number of selected speakers. In a prior art method, the optimum performance was obtained when the 50 closest training speakers were selected to build a speaker-adapted system. However, in the invention of the present disclosure in the experiments with the Mahalanobis distance, it is apparent that the performance is better when more speakers (the best performance is obtained when the number of clusters selected is 10, which corresponds to selecting a total of 184 speakers on average) are used. Meanwhile, from the experiments that use the Euclidean distance, we see that fewer clusters are needed to be selected (average number of speakers is 89) to obtain optimal performance. These experiments reflect the quality of different cluster selecting techniques.

Comparing these results with the MLLR technique, MLLR provides a 22.5% relative improvement over the speaker-independent system, while the present invention provides a relative improvement of 26.5% over the speaker-independent performance. A NIST 'standard' benchmark testing program, known to those skilled in the art, was used to compare the performance of the present invention with MLLR in terms of statistical significance. It shows the improvement over MLLR is significant and the improvement is at least 5% better than MLLR.

Having described preferred methods of a novel method and system of speaker adaptation based on class-specific pre-clustering training speakers (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method of speech recognition comprising the steps of:
   grouping acoustics to form classes based on acoustic features;
   clustering training speakers by the classes to provide class-specific cluster systems;
   selecting from the cluster systems, a subset of cluster systems closest to adaptation data from a speaker;
   transforming the subset of cluster systems to bring the subset of cluster systems closer to the speaker based on the adaptation data to form adapted cluster systems; and
   combining the adapted cluster systems to create a speaker adapted system for decoding speech from the speaker.

2. The method of speech recognition as recited in claim 1, wherein the step of transforming is performed by employing a maximum a posteriori adaptation.

3. The method of speech recognition as recited in claim 1, wherein the step of transforming is performed by employing maximum likelihood linear regression.

4. The method of speech recognition as recited in claim 1, wherein the step of selecting further comprises:
   calculating a likelihood between the speaker and each cluster system;
   ranking each cluster system according to likelihood; and
   selecting a predetermined number of cluster systems closest to the speaker adaptation data to form the subset of cluster systems.

5. The method of speech recognition as recited in claim 1, further comprising the step of building class-specific cluster systems based on speaker dependent systems and partitions of acoustic space, each partition of acoustic space being characterized by a different set of acoustic features.

6. The method of speech recognition as recited in claim 1, wherein the step of transforming further comprises transforming the subset of cluster systems to adapt the subset of cluster systems with a speaker independent system.

7. The method of speech recognition as recited in claim 1, wherein each cluster system includes a Hidden Markov Model system.

8. The method of speech recognition as recited in claim 1, wherein the step of transforming is performed by employing a Bayesian adaptation.

9. A method of building class-specific cluster systems comprising the steps of:
   providing a speaker dependent system for each of a plurality of training speakers;
   partitioning an acoustic space according to classes, each class being characterized by a set of acoustic features;
   grouping the speaker dependent systems with the acoustic spaces according to classes to build acoustic spaces with common features from all the speaker dependent systems; and
   clustering the grouped acoustic spaces with common features to form cluster systems based on acoustic characteristics of the speakers, the acoustic characteristics including class-specific characteristics.

10. The method of building class-specific cluster systems as recited in claim 9 further comprises the step of combining the cluster systems to form a cluster system for the full acoustic space.

11. The method of building class-specific cluster systems as recited in claim 9, wherein the step of clustering includes the step of clustering by a bottom-up method.

12. The method of building class-specific cluster systems as recited in claim 11, wherein the step of clustering by the bottom-up method includes measuring a distance between acoustic features between speakers by a Gaussian likelihood.

13. The method of building class-specific cluster systems as recited in claim 9, wherein the step of clustering includes the step of clustering by a top-down method.

14. The method of building class-specific cluster systems as recited in claim 13, wherein the step of clustering by the top-down method includes measuring a distance between acoustic features between speakers by a Euclidean distance.

15. The method of building class-specific cluster systems as recited in claim 9, wherein the step of clustering includes the step of clustering the grouped acoustic spaces to form cluster systems based on a common accent.

16. The method of building class-specific cluster systems as recited in claim 9, wherein the step of clustering includes the step of clustering the grouped acoustic spaces to form cluster systems based on a common gender.

17. The method of building class-specific cluster systems as recited in claim 9, wherein the step of providing a speaker dependent system for each of a plurality of training speakers further comprises the steps of:
   decoding training data of a speaker based on a speaker-independent system; and
   building the speaker dependent system by storing a set of labeled acoustic vectors for the speaker.

18. The method of building class-specific cluster systems as recited in claim 9, wherein the step of partitioning an acoustic space further includes the steps of:

gathering expectation-maximization counts of a same context from a speaker independent system;

generating a speaker independent context-independent system from the counts; and clustering the context-independent system to generate partitions of a whole acoustic space into the acoustic spaces.

19. A method of speech recognition comprising the steps of:

providing a speaker dependent system for each of a plurality of training speakers;

providing an acoustic space for each of the training speakers, each acoustic space being characterized by a set of acoustic features;

grouping the speaker dependent systems with the acoustic spaces to build acoustic spaces with common features from all the speaker dependent systems;

clustering the grouped acoustic spaces to form cluster systems based on a common acoustic characteristic;

selecting from a group of cluster systems, a subset of cluster systems closest to adaptation data from a speaker;

transforming the subset of cluster systems to bring the subset of cluster systems closer to the speaker based on the adaptation data to form adapted cluster systems; and combining the adapted cluster systems to create a speaker adapted system for decoding speech from the speaker.

20. The method of speech recognition as recited in claim 19, wherein the step of selecting further comprises:

calculating a likelihood for each cluster system;

ranking each cluster system according to likelihood; and selecting a predetermined number of cluster systems closest to the speaker adaptation data to form the subset of cluster systems.

21. The method of speech recognition as recited in claim 19, wherein the group of systems includes class-specific clusters and further comprises the step of building class-specific cluster systems based on speaker dependent systems and partitions of acoustic space, each partition of acoustic space being characterized by a different set of acoustic features.

22. The method of speech recognition as recited in claim 19, wherein each cluster system of the group of cluster systems includes a Hidden Markov Model system.

23. The method of speech recognition as recited in claim 19, further comprises the step of combining the cluster systems to form a speaker cluster system of all the acoustic spaces.

24. The method of speech recognition as recited in claim 19, wherein the step of clustering includes the step of clustering by a bottom-up method.

25. The method of speech recognition as recited in claim 24, wherein the step of clustering by the bottom-up method includes measuring a distance between acoustic features between speakers by a Gaussian likelihood.

26. The method of speech recognition as recited in claim 19, wherein the step of clustering includes the step of clustering by a top-down method.

27. The method of speech recognition as recited in claim 26, wherein the step of clustering by the top-down method includes measuring a distance between acoustic features between speakers by a Euclidean distance.

28. The method of speech recognition as recited in claim 19, wherein the step of providing a speaker dependent system for each of a plurality of training speakers further comprises the steps of:

decoding training data of a speaker based on a speaker-independent system; and building the speaker dependent system by storing a set of labeled acoustic vectors for the speaker.

29. The method of speech recognition as recited in claim 19, wherein the step of providing an acoustic space for each of the training speakers further includes the steps of:

gathering expectation maximization counts of a same context from a speaker independent system;

generating a speaker independent context-independent system from the counts; and clustering the context-independent system to generate partition of a whole acoustic space into the acoustic spaces.

30. A system for speech recognition comprising:

means for grouping acoustics to form classes based on acoustic features;

means for clustering training speakers by the classes to provide class-specific cluster systems;

means for selecting from the cluster systems, a subset of cluster systems closest to adaptation data from a speaker;

means for transforming the subset of cluster systems to bring the subset of cluster systems closer to the speaker based on the adaptation data to form adapted cluster systems; and means for combining the adapted cluster systems to create a speaker adapted system for decoding speech from the speaker.

31. The system for speech recognition as recited in claim 30, wherein the means for transforming includes means for employing a maximum a posteriori adaptation.

32. The system for speech recognition as recited in claim 30, wherein the means for transforming includes means for employing maximum likelihood linear regression.

33. The system for speech recognition as recited in claim 30, wherein the means for selecting further comprises:

means for calculating a likelihood between the speaker and each cluster system;

means for ranking each cluster system according to likelihood; and means for selecting a predetermined number of cluster systems closest to the speaker adaptation data to form the subset of cluster systems.

34. The system for speech recognition as recited in claim 30, wherein the group of systems includes class-specific clusters and further comprising means for building class-specific cluster systems based on speaker dependent systems and partitions of acoustic space, each partition of acoustic space being characterized by a different set of acoustic features.

35. The system for speech recognition as recited in claim 30, wherein each cluster system includes a Hidden Markov Model system.

36. A system for speech recognition comprising:

a speaker dependent system for each of a plurality of training speakers;

an acoustic space for each of the training speakers, each acoustic space being characterized by a set of acoustic features;

means for grouping the speaker dependent systems with the acoustic spaces to build acoustic spaces with common features from all the speaker dependent systems;

means for clustering the grouped acoustic spaces to form cluster systems based on a common acoustic characteristic;

means for selecting from a group of cluster systems, a subset of cluster systems closest to adaptation data from a speaker;

means for transforming the subset of cluster systems to bring the subset of cluster systems closer to the speaker based on the adaptation data to form adapted cluster systems; and means for combining the adapted cluster systems to create a speaker adapted system for decoding speech from the speaker.

37. The system for speech recognition as recited in claim 36, wherein the means for selecting further comprises:

means for calculating a likelihood for each cluster system;

means for ranking each cluster system according to likelihood; and means for selecting a predetermined number of cluster systems closest to the speaker adaptation data to form the subset of cluster systems.

38. The system for speech recognition as recited in claim 36, wherein the group of cluster systems includes class-specific clusters based on speaker dependent systems and partitions of acoustic space, each partition of acoustic space being characterized by a different set of acoustic features.

39. The system for speech recognition as recited in claim 36, wherein each cluster system of the group of cluster systems includes a Hidden Markov Model.

40. The system for speech recognition as recited in claim 36, further comprises a speaker cluster system formed by combining all of the acoustic spaces.

41. A program storage device readable by machine, tangibly embodying a program of instructions executable by the machine to perform method steps for speech recognition, the method steps comprising:

grouping acoustics to form classes based on acoustic features;

clustering training speakers by the classes to provide class-specific cluster systems;

selecting from the cluster systems, a subset of cluster systems closest to adaptation data from a speaker;

transforming the subset of cluster systems to bring the subset of cluster systems closer to the speaker based on the adaptation data to form adapted cluster systems; and combining the adapted cluster systems to create a speaker adapted system for decoding speech from the speaker.

42. A program storage device readable by machine, tangibly embodying a program of instructions executable by the machine to perform method steps for building class-specific cluster systems for speech recognition systems, the method steps comprising:

providing a speaker dependent system for each of a plurality of training speakers;

partitioning an acoustic space according to classes, each class being characterized by a set of acoustic features;

grouping the speaker dependent systems with the acoustic spaces according to classes to build acoustic spaces with common features from all the speaker dependent systems; and clustering the grouped acoustic spaces with common features to form cluster systems based on acoustic characteristics of the speakers, the acoustic characteristics including class-specific characteristics.

* * * * *